US012320189B2

(12) United States Patent
Daniels

(10) Patent No.: US 12,320,189 B2
(45) Date of Patent: Jun. 3, 2025

(54) DOOR WINDOW PROTECTOR

(71) Applicant: Osceola Cuts, LLC, Ocilla, GA (US)

(72) Inventor: William Bruce Daniels, Ocilla, GA (US)

(73) Assignee: Osceola Cuts, LLC, Ocilla, GA (US)

( * ) Notice: Subject to any disclaimer, the term of this patent is extended or adjusted under 35 U.S.C. 154(b) by 596 days.

(21) Appl. No.: 17/682,181

(22) Filed: Feb. 28, 2022

(65) Prior Publication Data

US 2022/0282562 A1 Sep. 8, 2022

Related U.S. Application Data

(60) Provisional application No. 63/157,333, filed on Mar. 5, 2021.

(51) Int. Cl.
*E06B 5/11* (2006.01)

(52) U.S. Cl.
CPC .................................... *E06B 5/11* (2013.01)

(58) Field of Classification Search
CPC ..... E06B 5/11; E06B 7/30; E06B 9/04; E06B 3/5892
See application file for complete search history.

(56) References Cited

U.S. PATENT DOCUMENTS

| | | | |
|---|---|---|---|
| 4,198,088 A | 4/1980 | Tochihara | |
| 5,152,563 A | 10/1992 | Fontenot | |
| 5,547,236 A | 8/1996 | Gregory | |
| 5,590,928 A | 1/1997 | Voiculescu | |
| 8,376,422 B2 | 2/2013 | Swink | |
| 9,988,833 B2 | 6/2018 | Powell | |
| 11,299,911 B2 | 4/2022 | Geenens et al. | |
| 11,447,991 B2 | 9/2022 | Taylor et al. | |
| 2014/0217754 A1 | 8/2014 | Taylor et al. | |
| 2016/0222720 A1 * | 8/2016 | Tamberino | E06B 7/30 |
| 2017/0145721 A1 | 5/2017 | Taylor et al. | |
| 2018/0333600 A1 | 11/2018 | Pristach | |

(Continued)

FOREIGN PATENT DOCUMENTS

| | | | |
|---|---|---|---|
| CN | 109184502 A * | 1/2019 | E05C 1/004 |
| GB | 2483919 | 3/2012 | |
| KR | 101693796 B1 * | 1/2017 | |

OTHER PUBLICATIONS

Daniels, William Bruce; Non-Final Office Action for U.S. Appl. No. 17/683,568, filed Mar. 1, 2022, mailed Dec. 20, 2023, 16 pgs.

*Primary Examiner* — Babajide A Demuren
(74) *Attorney, Agent, or Firm* — Buchalter, a Professional Corporation

(57) ABSTRACT

A door window protector includes a mounting frame defining a first frame side, a second frame side opposite the first frame side, a frame opening extending between the first frame side and the second frame side, and a lock opening formed through the mounting frame at the second frame side; and a protective panel received within the frame opening and comprising a locking member, the protective panel movable relative to the mounting frame between an open position, wherein the protective panel is disposed proximate to the first frame side and the locking member is disengaged from the lock opening, and a closed position, wherein the protective panel is disposed proximate to the second frame side and the locking member engages the lock opening.

20 Claims, 12 Drawing Sheets

(56) References Cited

U.S. PATENT DOCUMENTS

| | | | | |
|---|---|---|---|---|
| 2019/0249489 | A1* | 8/2019 | Young | E06B 9/04 |
| 2019/0271189 | A1* | 9/2019 | Ratliff | E05B 65/0882 |
| 2020/0018112 | A1* | 1/2020 | Coe | E05B 15/1614 |
| 2020/0270936 | A1* | 8/2020 | Sargent | E06B 5/106 |
| 2022/0205294 | A1 | 6/2022 | Taylor et al. | |
| 2022/0282536 | A1 | 9/2022 | Daniels | |

* cited by examiner

DOOR WINDOW PROTECTOR

CROSS-REFERENCE TO RELATED APPLICATIONS

The present application claims the benefit of U.S. Provisional Application No. 63/157,333, filed Mar. 5, 2021, which is hereby specifically incorporated by reference herein in its entirety.

TECHNICAL FIELD

This disclosure relates to windows. More specifically, this disclosure relates to a window protector for a door window.

BACKGROUND

Typical doors comprise a door panel and hinges configured to mount the door panel to a door frame. Doors can further comprise a door window mounted in an opening of the door panel. For example, doors with door windows are often found in office buildings and educational buildings, such as schools and colleges. However, door windows can be broken through, which can present a danger in situations where the door must be secured, such as a lockdown situation involving an unwelcome intruder. Door windows also allow intruders to look into the classroom for items to steal or people to attack.

SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts of the disclosure as an introduction to the following complete and extensive detailed description.

Disclosed is a door window protector comprising a mounting frame defining a first frame side, a second frame side opposite the first frame side, a frame opening extending between the first frame side and the second frame side, and a lock opening formed through the mounting frame at the second frame side; and a protective panel received within the frame opening and comprising a locking member, the protective panel movable relative to the mounting frame between an open position, wherein the protective panel is disposed proximate to the first frame side and the locking member is disengaged from the lock opening, and a closed position, wherein the protective panel is disposed proximate to the second frame side and the locking member engages the lock opening.

Also disclosed is a method of protecting a door window with a door window protector, the method comprising mounting the door window protector to a door, the door comprising the door window, wherein the door window protector comprises a mounting frame defining a frame opening, and wherein the door window is disposed within the frame opening; and covering the door window with a protective panel of the door window protector, wherein covering the door window the protective panel comprises: sliding the protective panel of the door window protector within the frame opening from an open position to a closed position; and engaging a locking member of the protective panel with a lock opening of the mounting frame.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Figure 1:
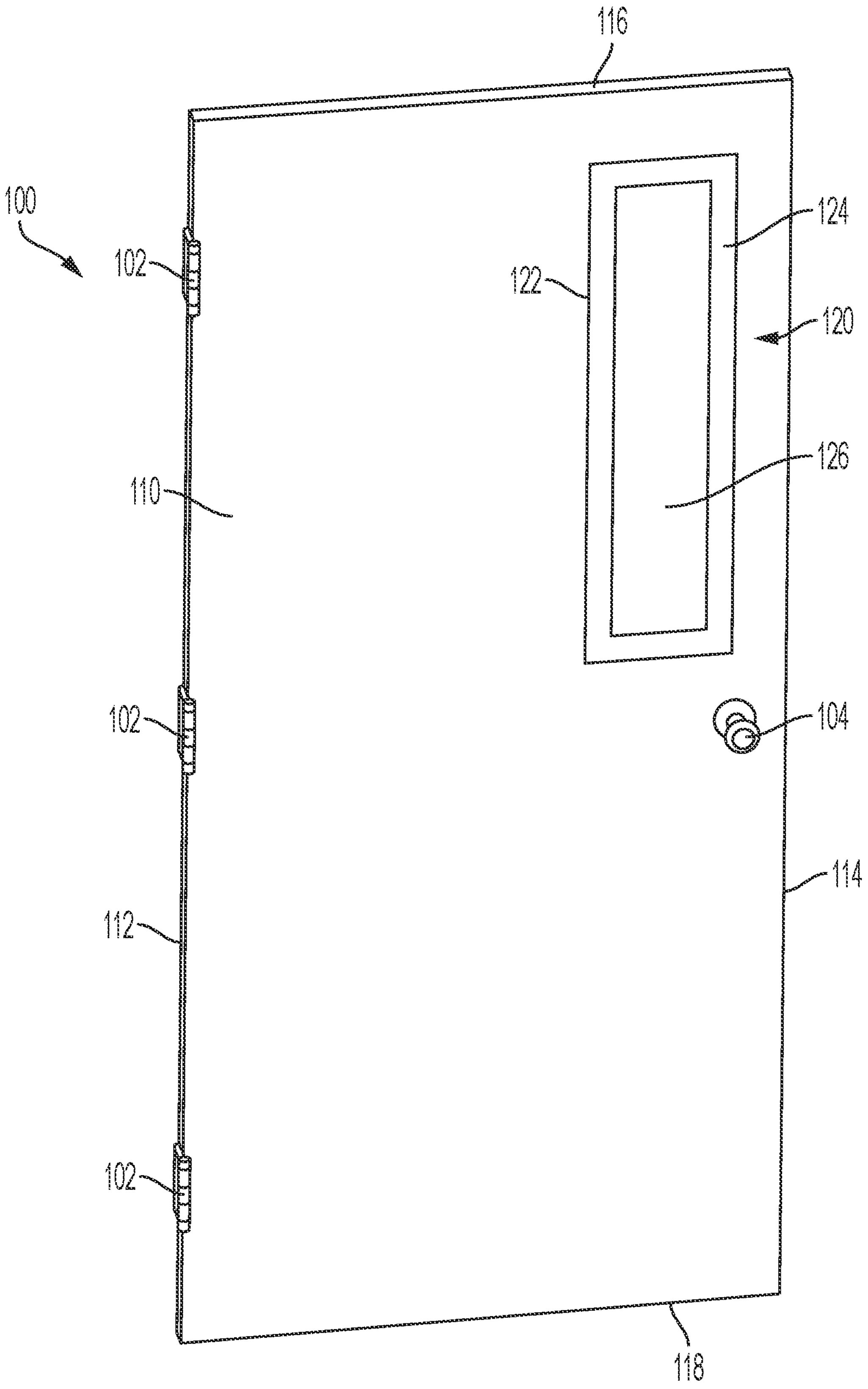
FIG. 1 PRIOR ART
FIG. 1 is a front perspective view of a prior art door with a door window.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutations of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is a door window protector and associated methods, systems, devices, and various apparatus. Example aspects of the door window protector can comprise a mounting frame and a protective panel. It would be understood by one of skill in the art that the door window protector is described in but a few exemplary embodiments among many. No particular terminology or description should be considered limiting on the disclosure or the scope of any claims issuing therefrom.

FIG. 1 is a front perspective view of a prior art door 100. The door 100 can comprise a door panel 110 defining a first door side 112, a second door side 114 opposite the first door side 112, a top door end 116, and a bottom door end 118 opposite the top door end 116. One or more hinges 102 can be coupled to the door panel 110 at the first door side 112 thereof. The hinges 102 can be configured to pivotably mount the door 100 to a door frame. In some aspects, a door knob 104 or door handle can be coupled to the door panel 110 proximate to the second door side 114, which can be gripped by a user to pivot the door 100 relative to the door frame. In the present aspect, the door 100 can further comprise a door window 120 mounted within a window opening 122 of the door panel 110. The door window 120 can be oriented proximate to the second door side 114 of the door panel 110, as shown, or can be oriented at any other suitable location within the door panel 110. As shown, the door window 120 can comprise a window frame 124 and a window panel 126. In example aspects, the window panel 126 can be transparent or translucent to allow viewing therethrough. For example, the window panel 126 can be formed from transparent glass in some aspects. Other aspects of the window panel 126 can be opaque.

Figure 2:
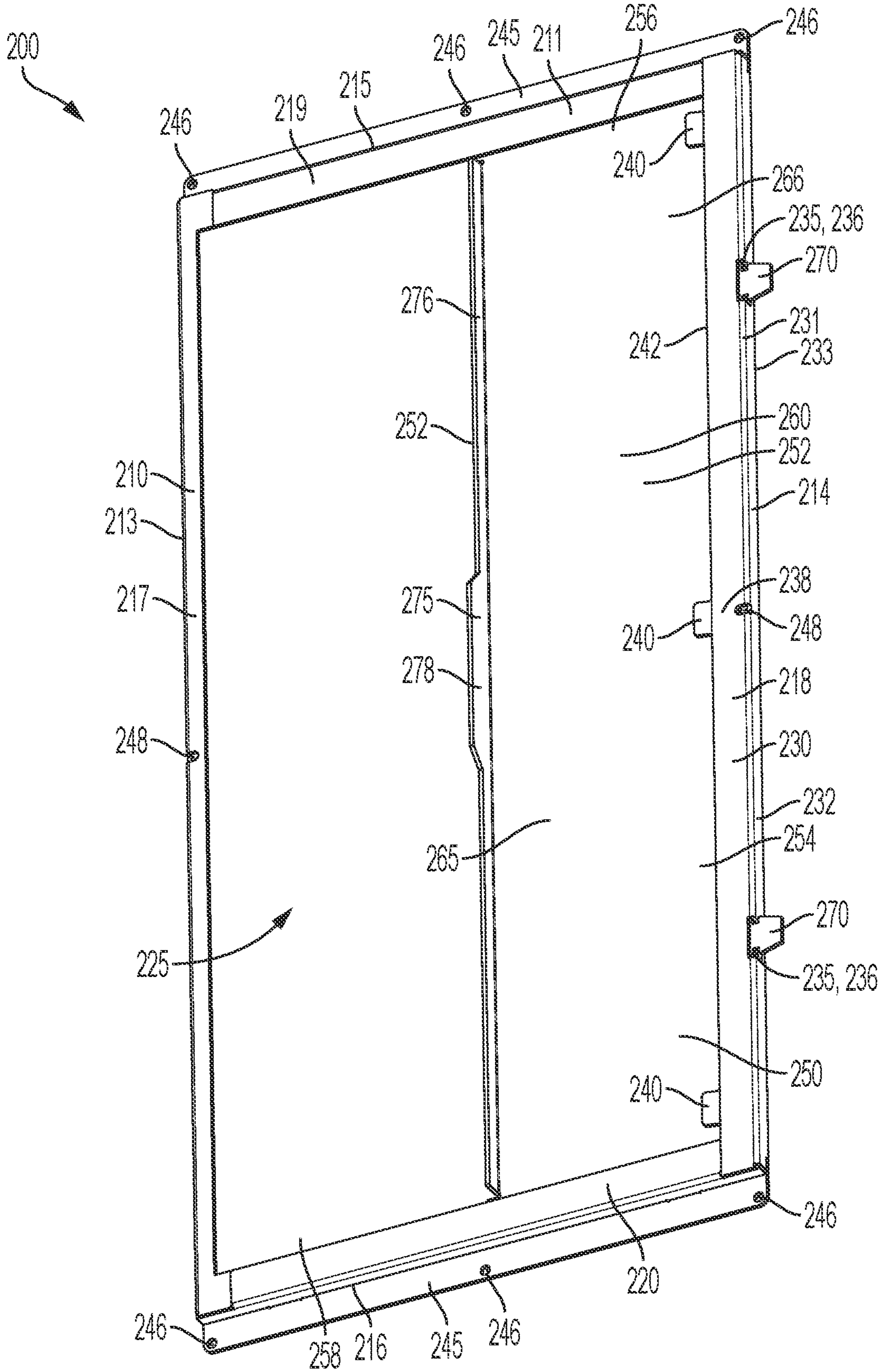
FIG. 2 is a front perspective view of a door window protector comprising a mounting frame and a protective panel, in accordance with one aspect of the present disclosure.
Figure 7:
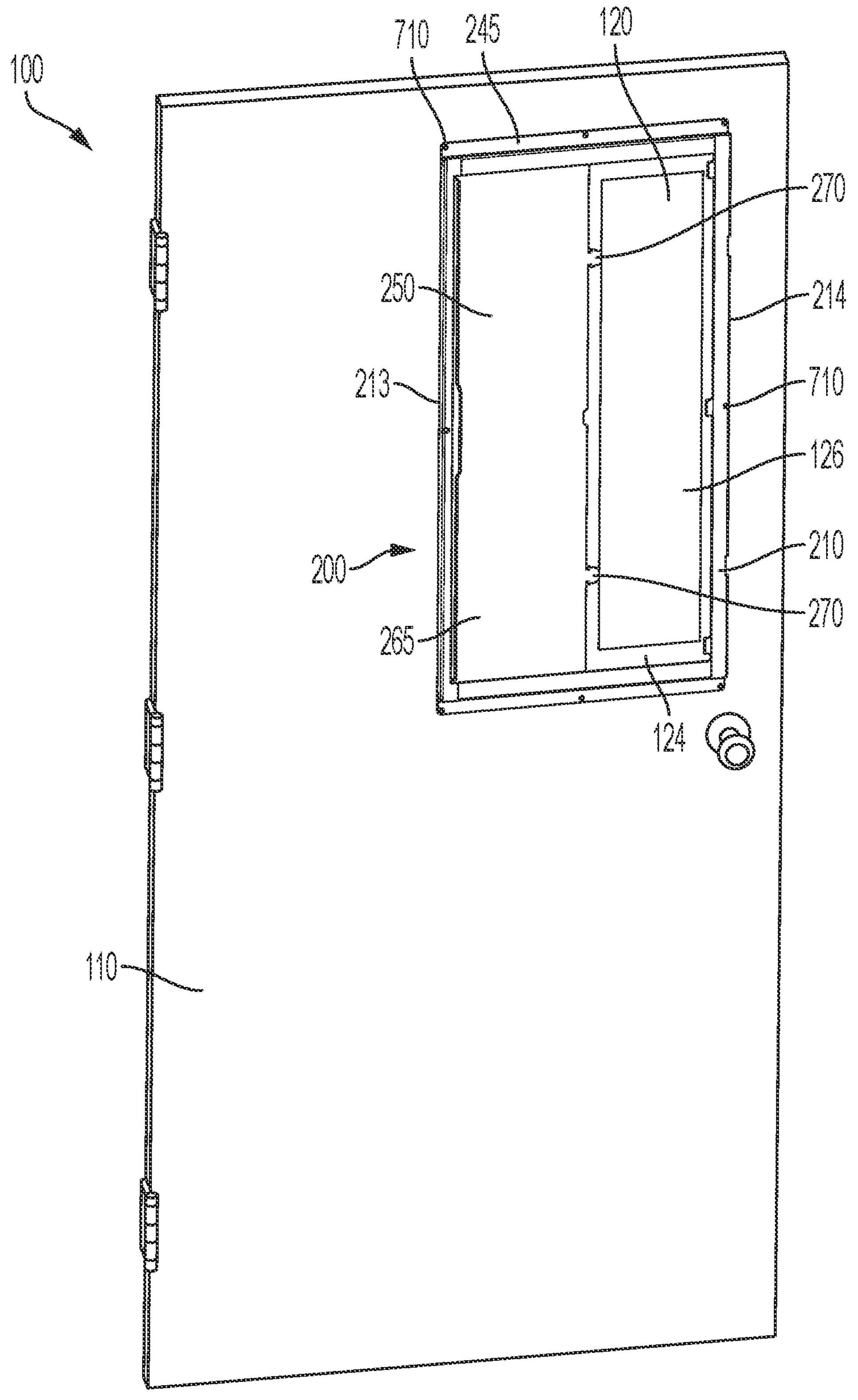
FIG. 7 is a front perspective view of the door window protector of FIG. 2 mounted to the door of FIG. 1 in an open configuration.
Figure 8:
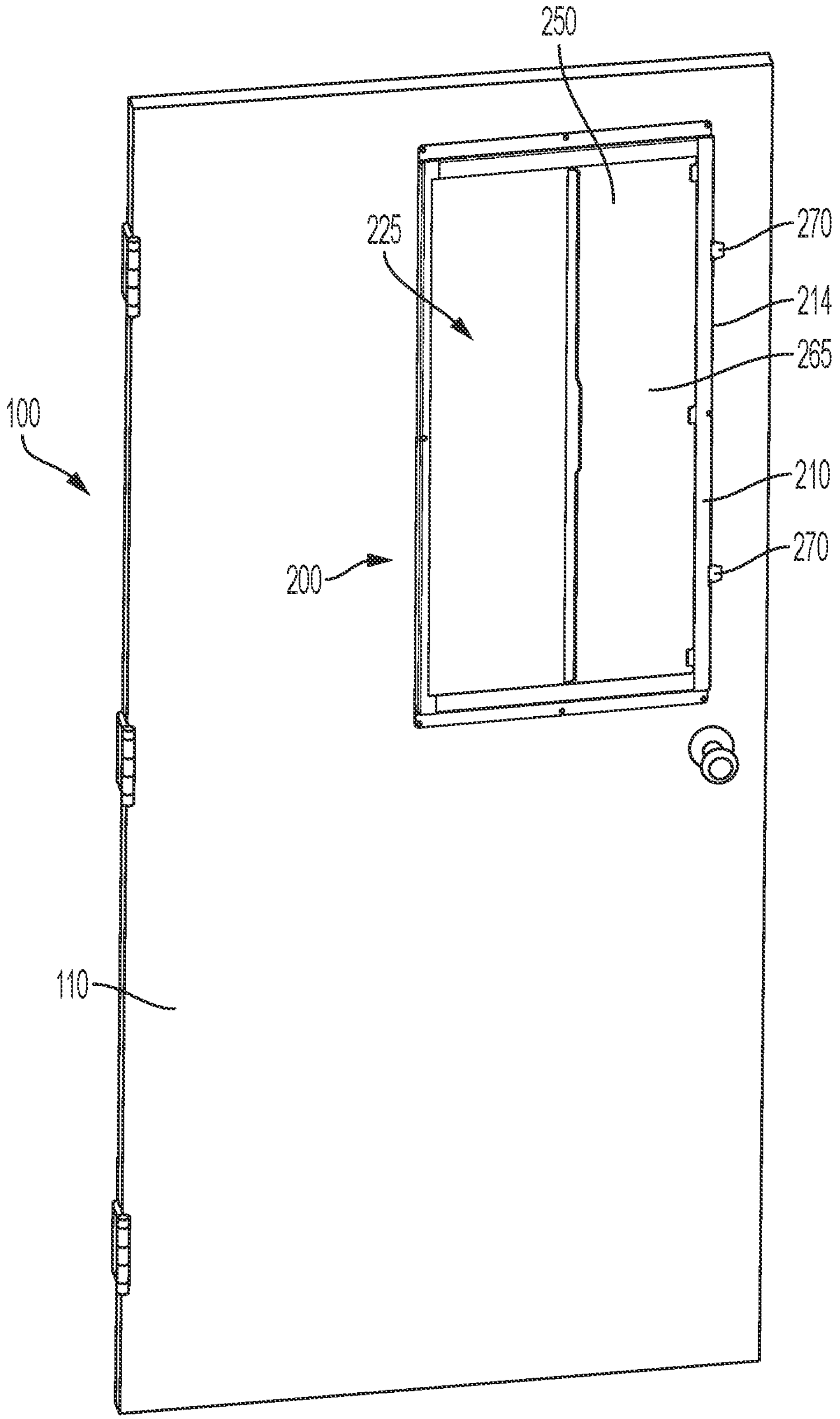
FIG. 8 is a front perspective view of the door window protector of FIG. 2 mounted to the door of FIG. 1 in a closed configuration.

FIG. 2 is a front perspective view of a door window protector 200, in accordance with one aspect of the present disclosure. The door window protector 200 can be mounted to a door having a door window, such as the door 100 of FIG. 1. Example aspects of the door window protector 200 can be oriented in a closed configuration, as shown in FIGS. 2 and 8, and an open configuration, as shown in FIG. 7. According to example aspects, the door window protector 200 can comprise a mounting frame 210 and a protective panel 250. Example aspects of the mounting frame 210 and the protective panel can comprise a metal material, such as, for example, steel. In other aspects, the protective panel can comprise any other suitably durable material, including, but not limited to, other metals, plastics, wood, composites, and the like.

In the present aspect, the mounting frame 210 can be substantially rectangular in shape. However, in other aspects, the mounting frame 210 can define any other suitable shape. As shown, the mounting frame 210 can define a front frame end 211, a rear frame end 412 (shown in FIG. 4A) opposite the front frame end 211, a first frame side 213, a second frame side 214 opposite the first frame side 213, an upper frame end 215, and a lower frame end 216 opposite the upper frame end 215. The mounting frame 210 can comprise a first side frame member 217 at the first frame side 213 thereof and a second side frame member 218 at the second frame side 214 thereof. The second side frame member 218 can be oriented opposite and substantially parallel to the first side frame member 217. Moreover, the first and second side frame members 217, 218 can be substantially vertically oriented in the present view. Example aspects of the mounting frame 210 can further comprise an upper frame member 219 at the upper frame end 215 thereof and a lower frame member 220 at the lower frame end 216 thereof. The lower frame member 220 can be oriented opposite and substantially parallel to the upper frame member 219. Moreover, the upper and lower frame members 219, 220 can be substantially horizontally oriented in the present view. As shown, the upper frame member 219 can extend between the first and second side frame members 217, 218 at the upper frame end 215 of the mounting frame 210, and the lower frame member 220 can extend between the first and second side frame members 217, 218 at the lower frame end 216 of the mounting frame 210. The upper and lower frame members 219, 220 can be secured to the first and second side frame members 217, 218 by any suitable fastener known in the art, including but not limited to, screws, bolts, rivets, welding, adhesive, and the like. In other aspects, some or all of the upper and lower frame members 219, 220 and the first and second side frame members 217, 218 can be monolithically formed with one another (i.e., formed as a singular component that constitutes a single material without joints or seams). The frame members 217, 218, 219, 220 can together define a frame opening 225 of the mounting frame 210.

According to example aspects, each of the first and second side frame members 217, 218 can be substantially L-shaped, and can define an elongated front plate 230 and an elongated side plate 232. The front plate 230 can be angled relative to the side plate 232; for example, the front plate 230 can be oriented about perpendicular to the side plate 232. Furthermore, each of the upper and lower frame members 219, 220 can be substantially U-shaped, and can define the front plate 230, the side plate 232, and an elongated rear plate 434 (shown in FIG. 4B). As shown, the front plates 230 can be formed generally at the front frame end 211 of the mounting frame 210 and can be substantially co-planar. Each of the side plates 232 can extend from the corresponding front plate 230, substantially from the front frame end 211 of the mounting frame 210 to the rear frame end 412 of the mounting frame 210. In the present aspect, each of the front plates 230 can extend inward towards the frame opening 225 from a front edge 231 of the corresponding side plate 232. Referring to the upper and lower frame members 219, 220 only, each of the rear plates 434 can be formed generally at the rear frame end 412 of the mounting frame 210 and can be substantially coplanar. The rear plates 434 can extend inward towards the frame opening 225 from a rear edge 233 of the corresponding side plate 232. Other aspects of the mounting frame 210 may not comprise the front plates 230 and/or the rear plates 434, or can comprise more or fewer front plates 230 and/or rear plates 434. Each of the front plates 230 and rear plates 434 can be monolithically formed with the corresponding side plate 232, as shown, or the front, side, and/or rear plates 230, 232, 434 can be formed separately and fastened together with any suitable fastener, such as screws, bolts, rivets, welding, and the like.

Referring to the second side frame member 218, one or more lock openings 235 can be formed through the corresponding side plate 232. In some aspects, a portion of each lock opening 235 be formed through the corresponding front plate 230. For example, the present aspect of the mounting frame 210 can comprise two of the lock openings 235. In other aspects, the mounting frame 210 can define more or fewer lock openings 235. In the present aspect, each of the lock openings 235 can be formed as a substantially vertical slot 236. A first one of the lock openings 235 can be oriented between the upper frame end 215 of the mounting frame 210 and a center 238 of the second side frame member 218, and a second one of the lock openings 235 can be oriented between the lower frame end 216 of the mounting frame 210 and the center 238 of the second side frame member 218. Each of the lock openings 235 can be configured to receive a locking member, such as a locking tab 270, of the protective panel 250, as described in further detail below. Other aspects of the lock openings 235 can define any other suitable configuration, such as a horizontal slots, and can be positioned at any suitable orientation along the second side frame member 218. Furthermore, in other aspects, the lock openings 235 can be formed through the side plate 232 of the first side frame member 217.

According to example aspects, the second side frame member 218 can further comprise one or more reinforcement tabs 240 extending from the corresponding front plate 230. For example, the present aspect of the mounting frame 210 can comprise three of the reinforcement tabs 240. In other aspects, the mounting frame 210 can define more or fewer reinforcement tabs 240. As shown, each of the reinforcement tabs 240 can extend from an inner edge 242 of the front plate 230 generally towards the first frame side 213, opposite the front edge 231 of the corresponding side plate 232. Each of the reinforcement tabs 240 can be substantially coplanar with one another, and in some aspects, can be angled forward slightly with respect to the front plate 230 away from rear frame end 412 of the mounting frame 210. In other aspects, the reinforcement tabs 240 can be substantially coplanar with the corresponding front plate 230 or can be angled slightly rearward towards the rear frame end 412. The reinforcement tabs 240 can be configured to limit or prevent forward movement of the protective cover towards the front frame end 211 of the mounting frame 210 in the closed configuration, as described in further detail below.

In example aspects, the mounting frame 210 can further comprise a fastening plate 245 coupled to each of the upper and lower frame members 219, 220 at the rear frame end 412 thereof. In other aspects, one of the fastening plates 245 can also or alternatively be coupled to each of the first and second side frame members 217, 218. The fastening plates 245 can be monolithically formed with the upper and lower frame members 219, 220 or can be formed separately and fastened thereto. According to the present aspect, the fastening plates 245 can be secured to the corresponding rear plates 434 of the upper and lower frame members 219, 220. The fastening plates 245 can be coplanar with one another and can be oriented parallel to the rear plates 434. In example aspects, each of the fastening plates 245 can extend vertically outward, relative to the orientation shown, beyond the corresponding upper and lower frame members 219, 220. In other aspects, the upper and lower frame members 219, 220 may not comprise the corresponding rear plates 434, and the fastening plates 245 can be secured to the corresponding side plates 232. In other aspects, the mounting frame 210 may not comprise the fastening plates 245.

Example aspects of the mounting frame 210 can define one or more primary mounting holes 246 formed through each of the fastening plates 245 for mounting the door window protector 200 to the door 100, as illustrated in FIG. 7. In other aspects, the mounting frame 210 may not comprise the fastening plates 245 and the primary mounting holes 246 can be formed through the rear plates 434.

Additionally, in some aspects, one or both of the first and second side frame members 217, 218 can define one or more secondary mounting holes 248 therethrough. For example, the secondary mounting holes 248 can be formed through the corresponding front plate 230 of the first and second side frame members 217, 218. Each of the primary mounting holes 246 and secondary mounting holes 248 can be configured to receive a fastener 710 (shown in FIG. 7) therethrough, which can engage the door panel 110 (shown in FIG. 1) of the door 100 (shown in FIG. 1) to secure the door window protector 200 thereto. The fasteners 710 can be screws, bolts, rivets, or any other suitable fastener known in the art. Furthermore, in other aspects, the door window protector 200 can be secured to the door 100 by any other suitable fastening mechanisms, such as, for example, welding or adhesives. In other aspects, the mounting frame 210 can be monolithically formed with the door panel 110.

Example aspects of the protective panel 250 can define a first panel side 252, a second panel side 254 opposite the first panel side 252, an upper panel end 256, and a lower panel end 258 opposite the upper panel end 256. The protective panel 250 can further define a front panel side 260 and a rear panel side 662 (shown in FIG. 6A) opposite the front panel side 260. According to example aspects, the protective panel 250 can comprise a panel body 265 defining a substantially planar front surface 266 generally at the front panel side 260 and a substantially planar rear surface 668 (shown in FIG. 6A) generally at the rear panel side 662. The protective panel 250 can be movably mounted within the frame opening 225 of the mounting frame 210 and can be selectively oriented in an open position, wherein the door window protector 200 is in the open configuration, and a closed position, as shown, wherein the door window protector 200 is in the closed configuration. Specifically, in the present aspect, the protective panel 250 can be configured to move laterally between the first frame side 213 of the mounting frame 210 and the second frame side 214 of the mounting frame 210. In the open configuration, the protective panel 250 can be positioned proximate to the first frame side 213, and in the closed configuration, the protective panel 250 can be positioned proximate to the second frame side 214, as shown.

According to example aspects, the protective panel 250 can comprise the locking tabs 270 extending from the panel body 265 at the second panel side 254. The locking tabs 270 can be oriented substantially coplanar with the panel body 265, as shown. In the closed configuration of the door window protector 200, each of the locking tabs 270 can be configured to extend through a corresponding one of the lock openings 235 of the mounting frame 210 to retain the protective panel 250 in the closed position. In the present aspect, each of the locking tabs 270 can comprise a lower locking shoulder 675 (shown in FIG. 6A) which can pass through the corresponding locking opening 235 as the protective panel 250 is moved from the open position to the closed position. However, in example aspects, the lower locking shoulders 675 can be configured to catch on the mounting frame 210 when attempting to move the protective panel 250 back to the open position, thereby retaining the protective panel 250 in the closed position until a sufficient force is applied. The locking tabs 270 are shown and described in further detail below with respect to FIGS. 5 and 6.

Additionally, in the closed configuration of the door window protector 200, the reinforcement tabs 240 of the mounting frame 210 can be positioned directly in front of the protective panel 250, relative to the orientation shown, and can generally face the planar front surface 266 of the panel body 265. In the present aspect, as described above, the reinforcement tabs 240 can be angled slightly forward, away from the rear frame end 412 of the mounting frame 210, and thus can be angled slightly away from the protective panel 250. As such, in the present aspect, the reinforcement tabs 240 do not engage the protective panel 250 in normal operation. However, the reinforcement tabs 240 can engage the protective panel 250 and can serve as a stop in the event that the protective panel 250 is biased towards the front frame end 211, such as by someone pushing on the rear surface 668 of the protective panel 250.

According to example aspects, the protective panel 250 can be configured to slide between the open and closed positions within one or more guide channels 410 (shown in FIG. 4B) of the mounting frame 210. For example, in the present aspect, the mounting frame 210 can define an upper guide channel 410*a* (shown in FIG. 4B) of the guide channels 410 proximate to the upper frame end 215 thereof and a lower guide channel 410*b* (shown in FIG. 4C) of the guide channels 410 proximate to the lower frame end 216 thereof. The panel body 265 at the upper panel end 256 of the protective panel 250 can engage and slide within the upper guide channel 410*a*, and the panel body 265 at the lower panel end 258 of the protective panel 250 can engage and slide within the lower guide channel 410*b*. In example aspects, each of the guide channels 410 can generally be defined by the corresponding front plate 230, side plate 232, and rear plate 434, as shown and described in further detail with respect to FIG. 4B. In other aspects, the protective panel 250 can be configured to roll along the mounting frame 210, can pivot relative to the mounting frame 210, or can be otherwise configured to move relative to the mounting frame 210 between the open and closed positions.

Some example aspects of the protective panel 250 can further comprise a panel handle 275 configured to be manually engaged by a user. For example, the panel handle 275 can be pushed, pulled, or otherwise biased by a user to slide the protective panel 250 between the open and closed positions. In the present aspect, the panel handle 275 can define a substantially planar handle ledge 276 extending from the panel body 265 at the first panel side 252. As shown, the handle ledge 276 can be oriented about perpendicular to the panel body 265 and can extend substantially along a height of the panel body 265. In other aspects, the handle ledge 276 may not extend fully along the height of the panel body 265 and/or may not be oriented perpendicular to the panel body 265. Furthermore, in other aspects, the panel handle 275 can be positioned elsewhere, including, for example, at the second panel side 254 or extending anywhere from the front surface 266 of the panel body 265. According to example aspects, the panel handle 275 can further comprise a substantially planar handle grip 278 extending from the handle ledge 276 distal to the panel body 265. In the present aspect, the handle grip 278 can be positioned about centrally along a height of the handle ledge 276. Furthermore, the handle grip 278 be oriented substantially coplanar with the handle ledge 276. In other aspects, the handle grip 278 can be located elsewhere along the height of the handle ledge 276 or can extend fully along the height of the handle ledge 276. In other aspects, the handle grip 278 may not be coplanar with the handle ledge 276 and may extend in a different direction, such as towards the first or second frame side 213, 214 of the mounting frame 210. A user can manually engage and can push or pull the handle grip 278 or the handle ledge 276 to move the protective panel 250 relative to the mounting frame 210.

Figure 3A:
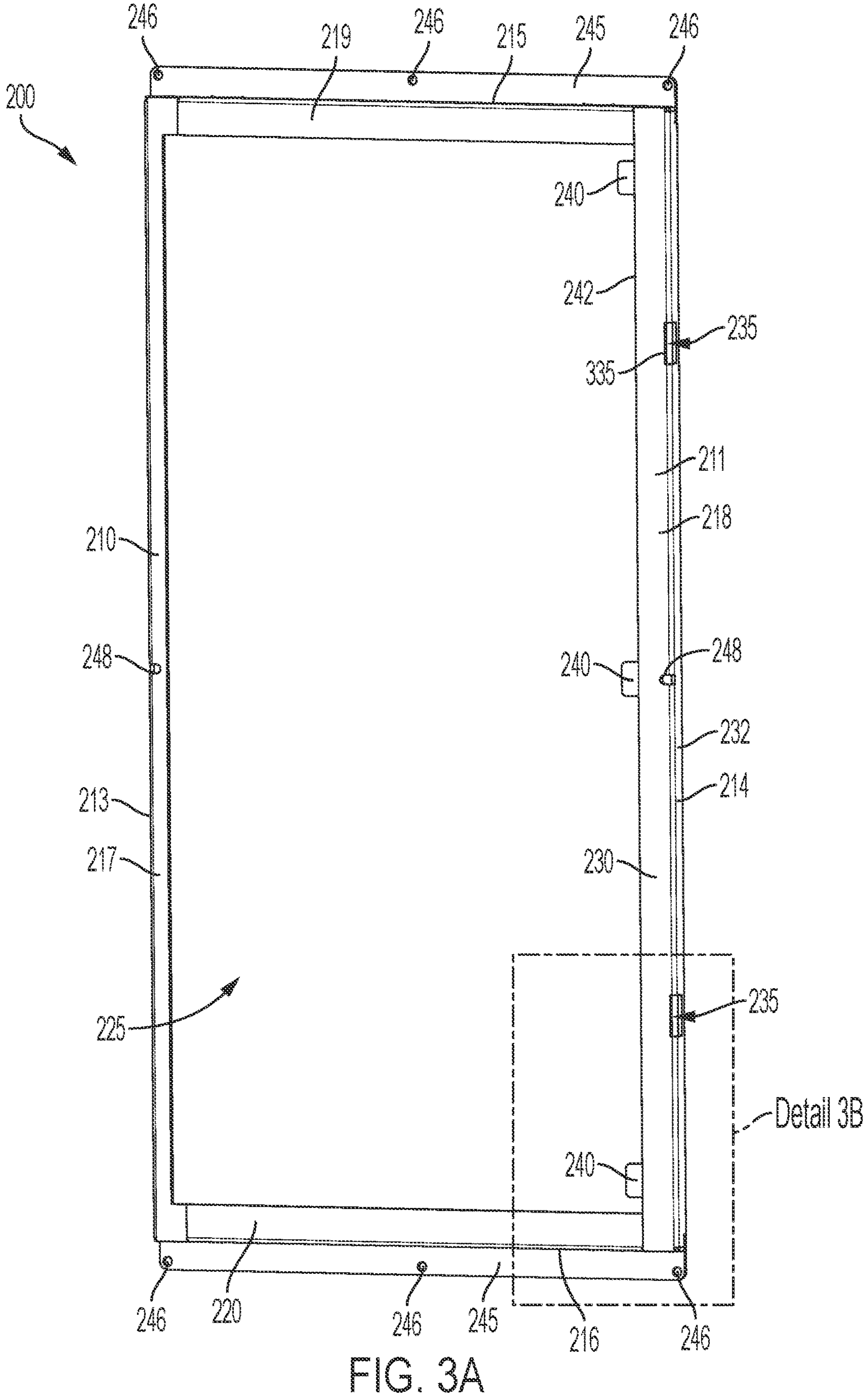
FIG. 3A is a front perspective view of the mounting frame of FIG. 2.
Figure 4A:
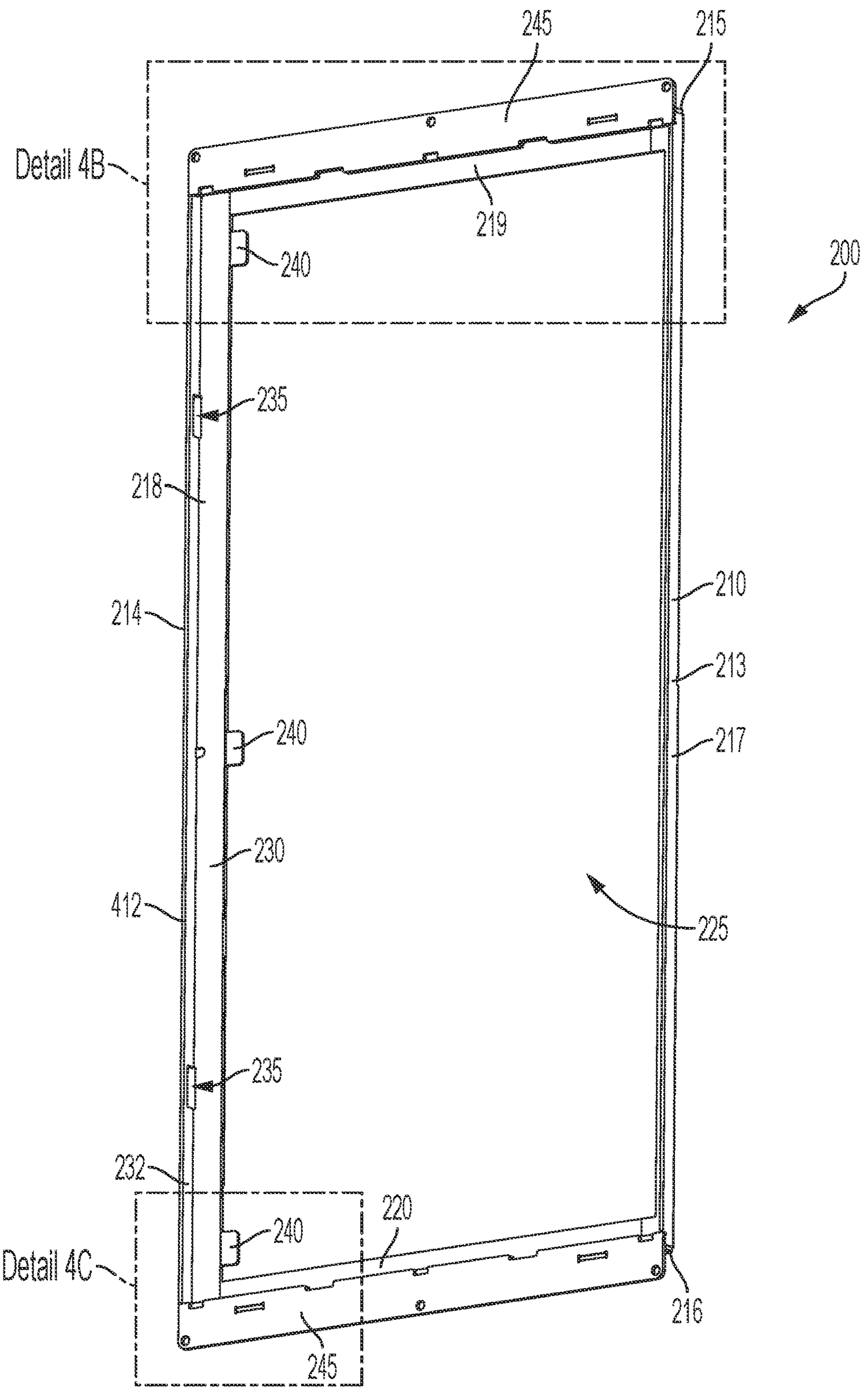
FIG. 4A is a rear perspective view of the mounting frame of FIG. 2.

FIGS. 3A and 4A illustrates front and rear perspective views of the mounting frame 210 of the door window protector 200, respectively. Example aspects of the mounting frame 210 can define the front frame end 211, rear frame end 412 (shown in FIG. 4A), first frame side 213, second frame side 214, upper frame end 215, and lower frame end 216. The mounting frame 210 can comprise the first side frame member 217 at the first frame side 213, the second side frame member 218 at the second frame side 214 thereof, the upper frame member 219 at the upper frame end 215, and the lower frame member 220 at the lower frame end 216 thereof. The frame members 217, 218, 219, 220 can together define the frame opening 225 of the mounting frame 210. Each of the lock openings 235 can be formed in the side plate 232 of the second side frame member 218 and can be defined by a corresponding opening edge 335 of the mounting frame 210. The reinforcement tabs 240 can extend from the inner edge 242 of the front plate 230 of the second side frame member 218. One of the fastening plates 245 can extend from each of the upper and lower frame members 219, 220 at the rear frame end 412 of the mounting frame 210. The primary mounting holes 246 can be formed through the fastening plates 245 and the secondary mounting holes 248 can be formed through the first and second side frame members 217, 218.

Figure 3B:
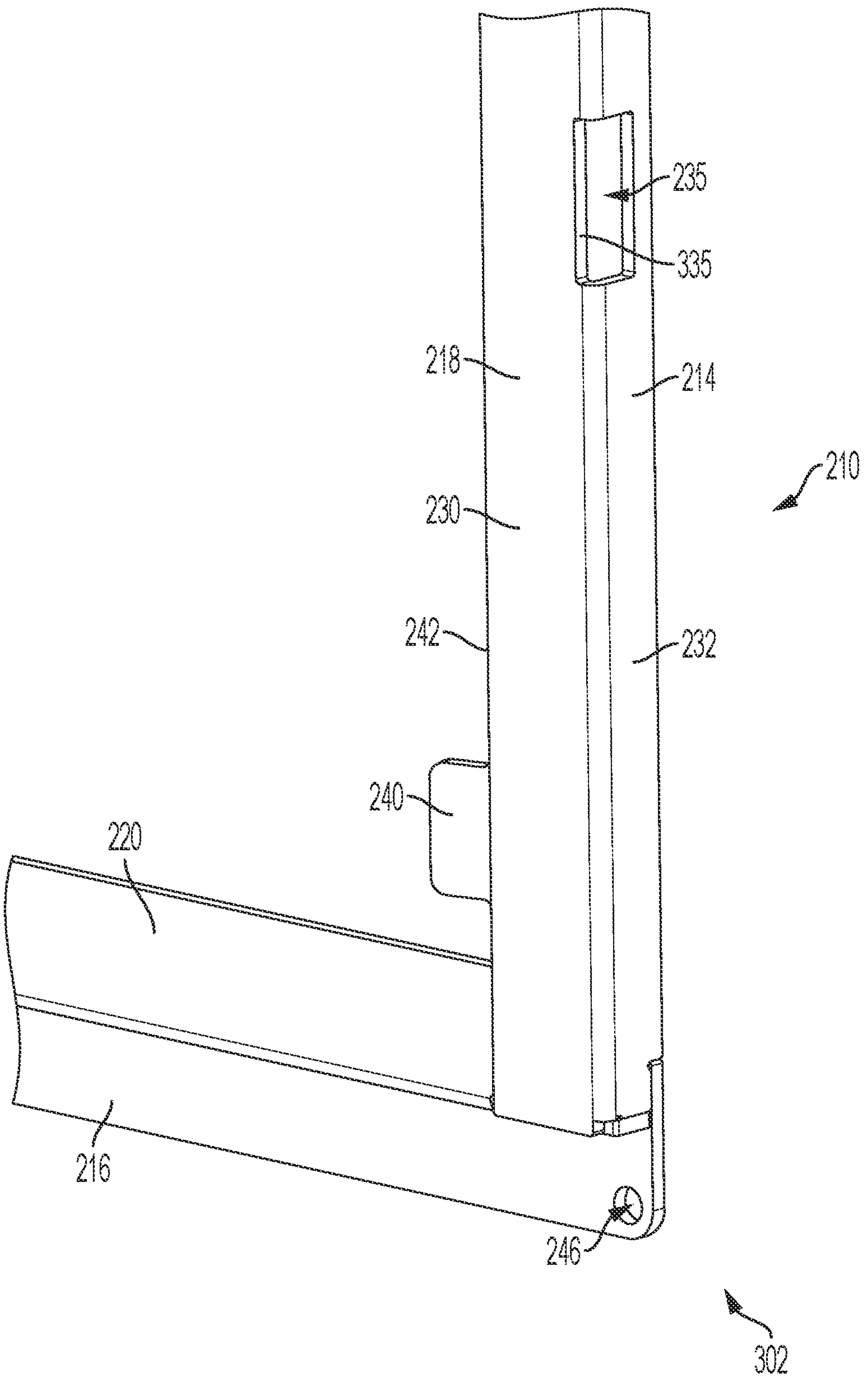
FIG. 3B is a close-up of Detail 3B taken from FIG. 3A, showing a front perspective view of a lower right corner of the mounting frame of FIG. 2.

FIG. 3B illustrates a close-up of a lower right corner 302 of the mounting frame 210, showing a lower one of the lock openings 235 formed through the second side frame member 218 and a lower one of the reinforcement tabs 240 extending from the front plate 230 of the second side frame member 218. As shown, the lock opening 235 can be formed through the side plate 232 of the second side frame member 218, and can extend into the front plate 230. In other aspects, the lock opening 235 may not extend into the front plate 230. Furthermore, as shown, the reinforcement tab 240 can be angled forward from the inner edge 242 of the front plate 230.

Figure 4B:
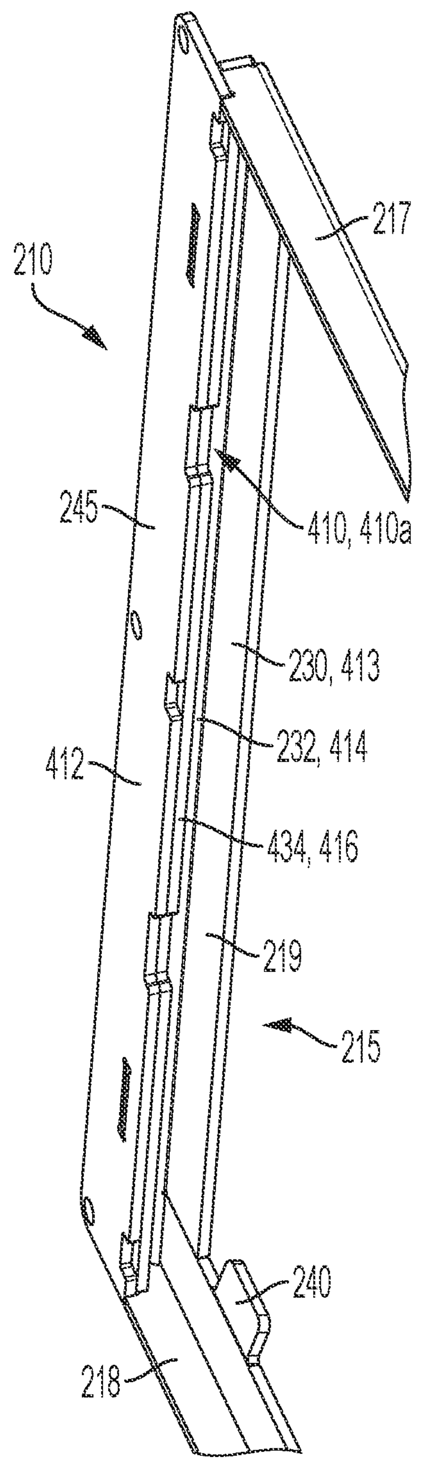
FIG. 4B is a close-up of Detail 4B taken from FIG. 4A, showing a rear perspective view of an upper frame end of the mounting frame of FIG. 2.

FIG. 4B illustrates one of the guide channels 410 of the mounting frame 210, in accordance with an example aspect of the present disclosure. In particular, the upper guide channel 410*a* formed generally at or proximate to the upper frame end 215 is illustrated, which can also be representative of the lower guide channel 410*b* (shown in FIG. 4C). As shown, the upper frame member 219 and the corresponding fastening plate 245 can be oriented at the upper frame end 215 of the mounting frame 210 and can extend substantially between the first side frame member 217 and the second side frame member 218. The upper frame member 219 can be substantially U-shaped, as described above, and can comprise the corresponding front plate 230, side plate 232, and rear plate 434. According to example aspects, the front plate 230, side plate 232, and rear plate 434 can respectively define a front side 413, a bottom 414, and a rear side 416 of the upper guide channel 410*a*. In some aspects, the upper and lower frame members 219, 220 (lower frame member 220 shown in FIG. 4C) may not comprise the corresponding rear plates 434, in which case the corresponding fastening plate 245 can define the rear side 416 of the guide channel 410.

Figure 4C:
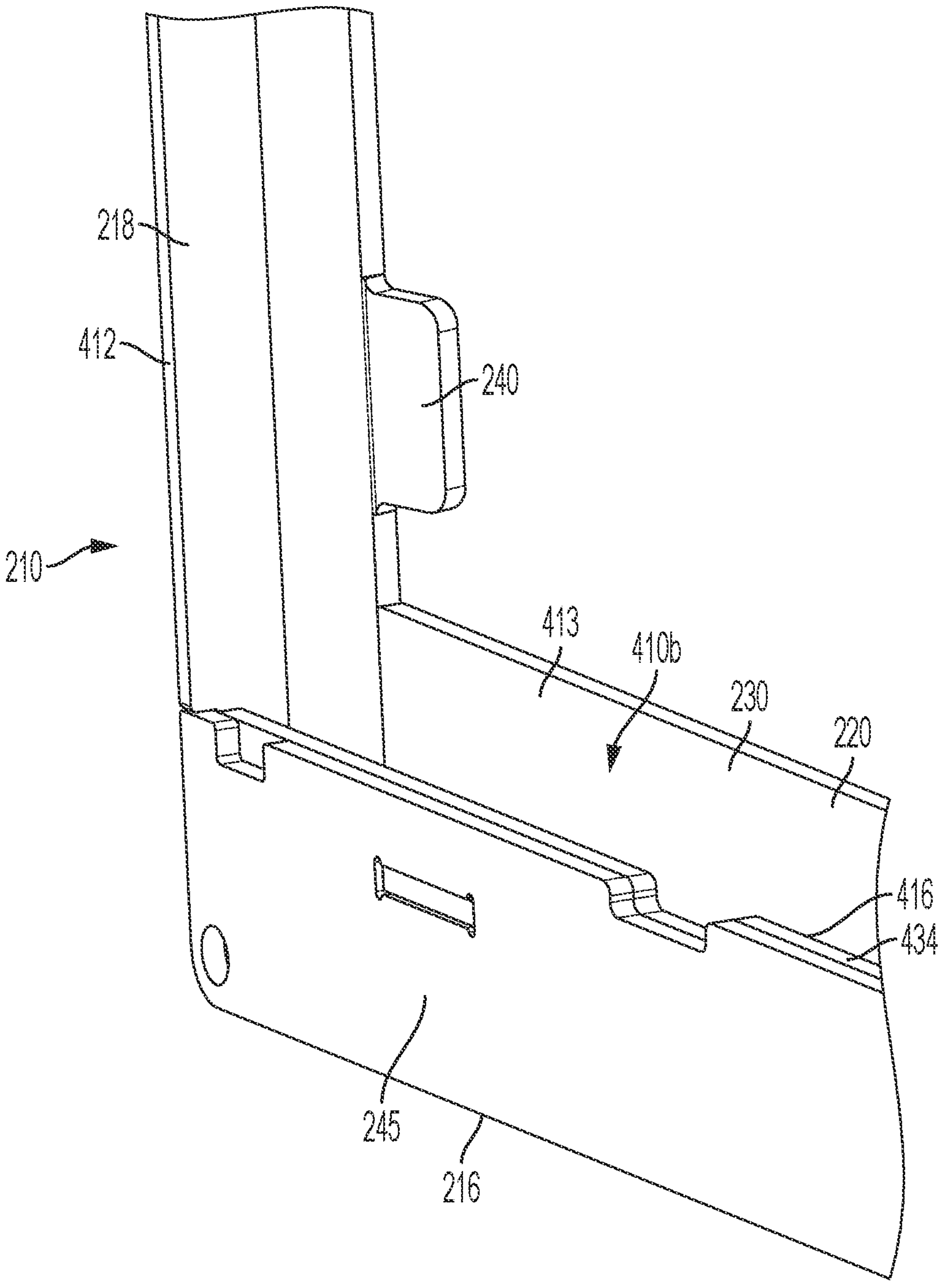
FIG. 4C is a close-up of Detail 4C taken from FIG. 4A, showing a rear perspective view of the lower right corner of the mounting frame of FIG. 2.

FIG. 4C illustrates the lower guide channel 410*b* formed generally at or proximate the lower frame end 216 of the mounting frame 210. The lower frame member 220 and the corresponding fastener plate 245 can be oriented at the lower frame end 216, and can extend substantially between the first side frame member 217 (shown in FIG. 2) and the second side frame member 218. Like the upper frame member 219 (shown in FIG. 4B), the lower frame member 220 can be substantially U-shaped and can comprise the corresponding front plate 230, side plate 232 (shown in FIG. 4B), and rear plate 234. The front plate 230, side plate 232, and rear plate 434 of the lower frame member 220 can define the corresponding front side 413, bottom 414 (shown in FIG. 4B), and rear side 416 of the lower guide channel 410*b*.

Figure 5:
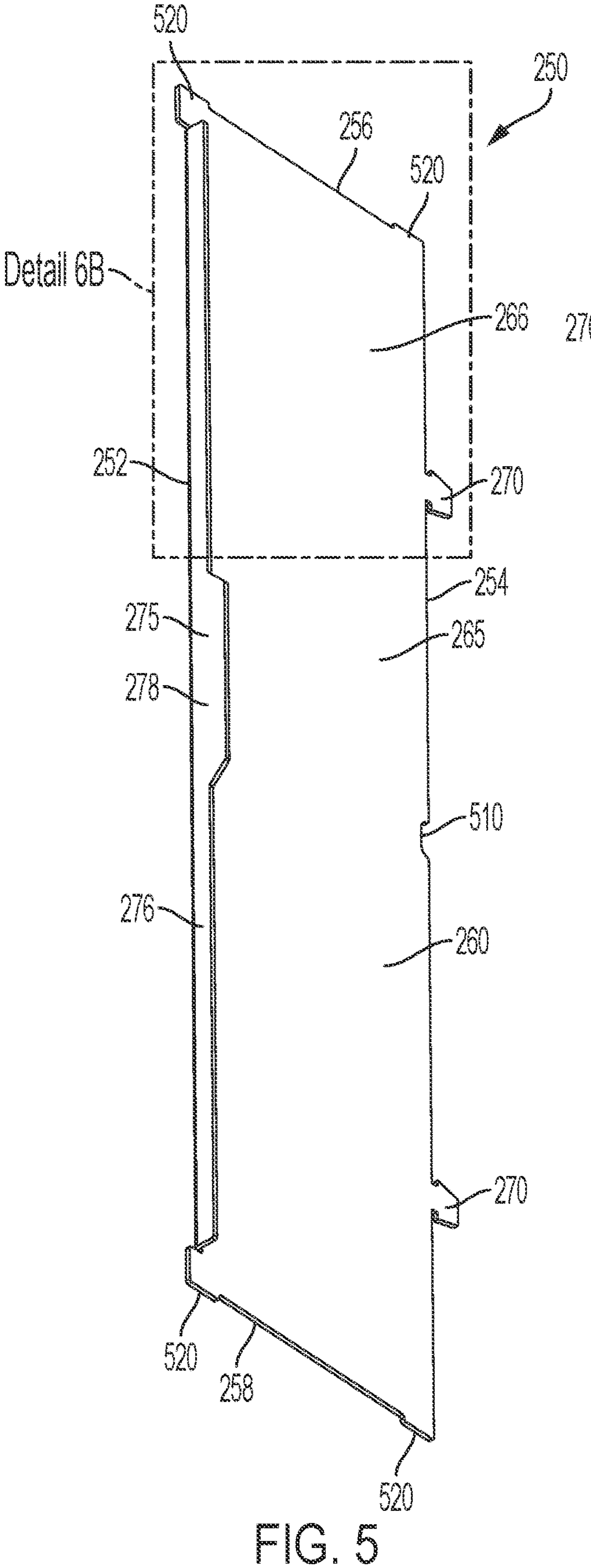
FIG. 5 is a front perspective view of the protective panel of FIG. 2.
Figure 6A:
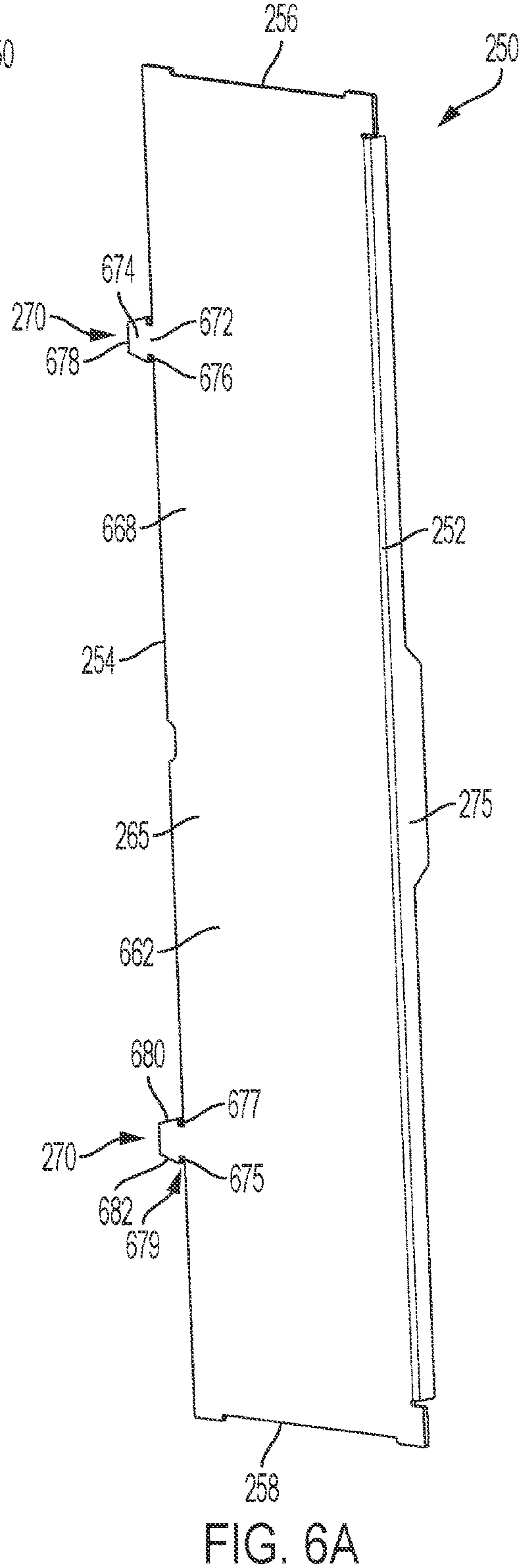
FIG. 6A is a rear perspective view of the protective panel of FIG. 2.

FIGS. 5 and 6A illustrate front and rear perspective views, respectively, of the protective panel 250, according to an example aspect of the present disclosure. As shown, the protective panel 250 can define the first panel side 252, the second panel side 254, the upper panel end 256, and the lower panel end 258. The protective panel 250 can further define the front panel side 260 and the rear panel side 662 (shown in FIG. 6A). Example aspects of the protective panel 250 can comprise the panel body 265 defining the front surface 266 and the opposite rear surface 668. The panel handle 275 can extend from the panel body 265 generally at the first panel side 252, and the locking tabs 270 can extend from the panel body 265 generally at the second panel side 254. Example aspects of the panel body 265 can define a recess 510 formed at the second panel side 254 and oriented between the locking tabs 270. In the closed position, the recess 510 can prevent the panel body 265 from hitting the fastener 710 (shown in FIG. 7) extending through the secondary mounting hole 248 (shown in FIG. 2) formed in the second side frame member 218 (shown in FIG. 2). Additionally, in some aspects, the protective panel 250 can define one or more channel tabs 520 extending from the panel body 265 at the upper panel end 256 and the lower panel end 258. The channel tabs 520 can be configured to ride within the corresponding upper and lower guide channels 410*a, b* (shown in FIGS. 4B and 4C, respectively) of the mounting frame 210 (shown in FIG. 2).

Referring to FIG. 6A, each of the locking tabs 270 can define a tab leg 672 and a tab head 674. The tab leg 672 can extend from the panel body 265, and the tab head 674 can extend from the tab leg 672 at a proximal end 676 of the tab head 674, distal to the panel body 265. In the present aspect, a width of the tab head 674 at the proximal end 676 can be greater than a width of the tab leg 672, and the tab head 674 can define the lower locking shoulder 675 and an opposing upper shoulder 677 extending inward to the tab leg 672 at the proximal end 676. A locking slot 679 can be defined between the lower locking shoulder 675 and the panel body 265. Each of the tab heads 674 can further define an upper side 680 and a lower side 682. In the present aspect, each of the upper side 680 and the lower side 682 can taper generally from the proximal end 676 of the locking tab 270 to the distal end 678. Thus, a width of each tab heads 674 can taper from the corresponding proximal end 676 to the corresponding distal end 678, which can facilitate the passage of the locking tabs 270 through the corresponding lock openings 235. In other aspects, the upper side 680 and/or the lower side 682 may not be tapered.

Each of the lower locking shoulders 675 can be configured to pass through the corresponding lock opening 235 (shown in FIG. 2) of the mounting frame 210 (shown in FIG. 2) as the protective panel 250 is moved to the closed position, but can catch on the mounting frame 210 when attempting to move the protective panel 250 back to the open position. In the present aspect, when moving the protective panel 250 to the closed position, the tapered lower side 682 of the tab head 274 can slide along the corresponding opening edge 335 (shown in FIG. 3A) of the mounting frame 210 (shown in FIG. 2). The tapered configuration of the tapered lower side 682 can lift the protective panel 250 slightly relative to the mounting frame 210 as the tab head 274 passes through the lock opening 235 (shown in FIG. 2). Once the tab head 274 has passed fully through the lock opening 235, the protective panel 250 can drop slightly, such that opening edge 335 of the mounting frame 210 can engage the locking slot 679. In some aspects, the tab leg 672 can rest on the opening edge 335. If an attempt is made to move the protective panel 250 back to the open position, the lower locking shoulder 675 will abut the mounting frame 210 to retain the protective panel 250 in the closed position. To move the protective panel 250 to the open position, the protective panel 250 must be lifted so that the lower locking shoulder 675 can clear the opening edge 335 and horizontally align with the lock opening 235. Furthermore, as shown, each of the locking tabs 270 can define a distal end 678 opposite the proximal end 676 thereof.

Figure 6B:
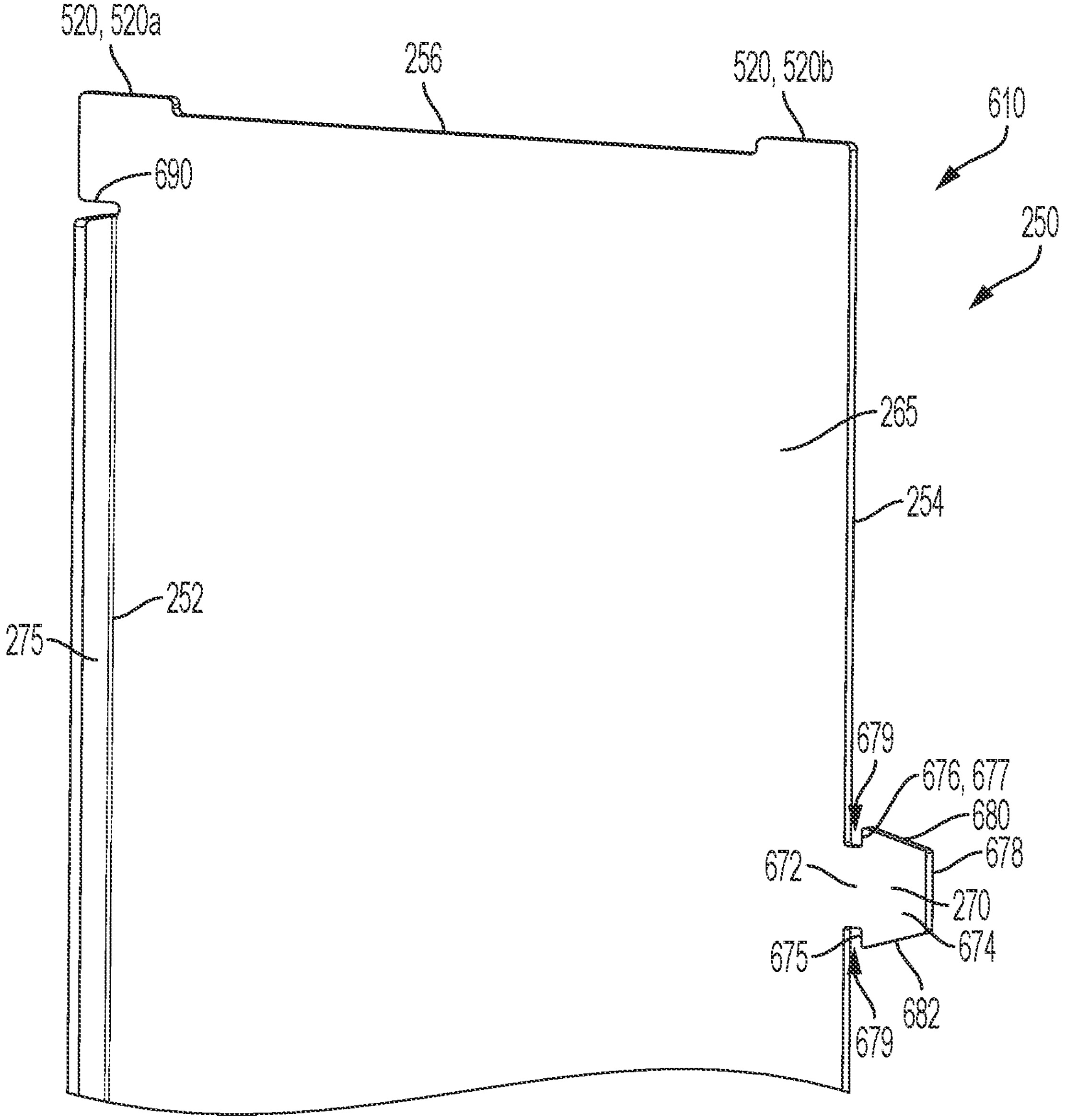
FIG. 6B is a close-up of Detail 6B taken from FIG. 5, showing a front perspective view of an upper portion of the protective panel of FIG. 2.

FIG. 6B illustrates a front perspective view of an upper portion 610 of the protective panel 250, showing an upper one of the locking tabs 270 extending from the panel body 265 at the second panel side 254. As shown, each of the locking tabs 270 can define the tab leg 672 and the tab head 674. The tab head 674 can define the proximal end 676 and the distal end 678. The lower locking shoulder 675 and the upper locking shoulder 677 can be defined at the proximal end 676, and one of the locking slots 679 can be defined between each of the lower and upper locking shoulders 675, 677 and the second panel side 254. The tab head 674 can further define the tapered upper side 680 and the tapered lower side 682.

Furthermore, as shown, a pair of the channel tabs 520 can extend from the panel body 265 at the upper panel end 256. For example, a first channel tab 520*a* of the channel tabs 520 can extend from the upper panel end 256 at or near the first panel side 252, and a second channel tab 520*b* of the channel tabs 520 can extend from the upper panel end 256 at or near the second panel side 254. Additionally, the panel handle 275 can formed monolithically with the panel body 265, and can be bent forward relative to the panel body 265 at the first panel side 252. In some aspects, a panel slot 690 can extend into the panel body 265 at the first panel side 252 proximate to each of the upper panel end 256 and the lower panel end 258 (shown in FIG. 6A), and the panel slots 690 can facilitate bending the panel handle 275 relative to the panel body 265.

FIGS. 7 and 8 illustrate the door window protector 200 mounted to the door panel 110 of the door 100 and oriented in the open and closed configurations, respectively. Referring to FIG. 7, the door window protector 200 can be secured to the door 100 by the fasteners 710, wherein each fastener 710 can extend through a corresponding primary mounting holes 246 (shown in FIG. 2) or secondary mounting holes 248 (shown in FIG. 2) of the mounting frame 210 to engage the door panel 110. The door window protector 200 can be positioned on the door panel 110 such that the mounting frame 210 can surround the door window 120 of the door 100 and the door window 120 can be disposed within the frame opening 225. Example aspects of the door window protector 200 can be selectively configured in the open configuration, as shown, and the closed configuration. In the open configuration, the protective panel 250 of the door window protector 200 can be oriented in the open position proximate to the first frame side 213 of the mounting frame 210, such that the window panel 126 of the door window 120 can be uncovered or at least partially uncovered by the protective panel 250. Referring to FIG. 8, in the closed configuration, the protective panel 250 can be oriented in the closed position proximate to the second frame side 214 of the mounting frame 210, and the window panel 126 (shown in FIG. 7) can be covered by the protective panel 250.

Figure 9:
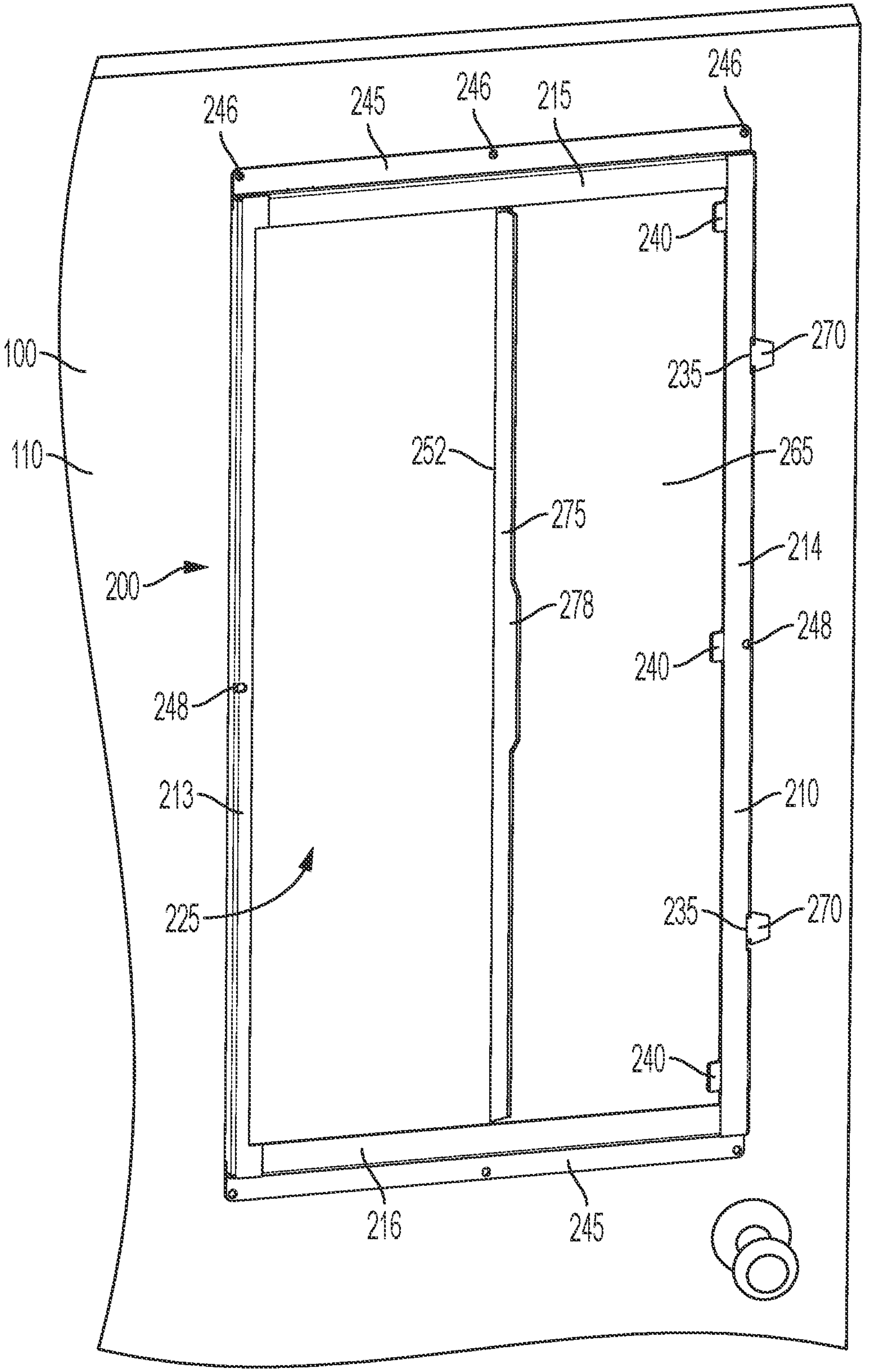
FIG. 9 is a close-up, front perspective view of the door window protector of FIG. 2 mounted to the door of FIG. 1 in the closed configuration.

FIG. 9 illustrates a close-up view of the door window protector 200 mounted to the door panel 110 of the door 100 and oriented in the closed configuration.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A door window protector comprising:

a mounting frame defining a first frame side, a second frame side opposite the first frame side, a frame opening extending between the first frame side and the second frame side, and a lock opening formed through the mounting frame at the second frame side; and a protective panel received within the frame opening and comprising a locking member, the protective panel movable relative to the mounting frame between an open position, wherein the protective panel is disposed proximate to the first frame side and the locking member is disengaged from the lock opening, and a closed position, wherein the protective panel is disposed proximate to the second frame side and the locking member engages the lock opening;

wherein the mounting frame comprises a side frame member disposed at the second frame side, the side frame member comprising a side plate, the lock opening formed through the side plate.

2. The door window protector of claim 1, wherein the side frame member further comprises a front plate extending from a front edge of the side plate towards the first frame side and oriented about perpendicular to the side plate.

3. The door window protector of claim 2, wherein the mounting frame further comprises a reinforcement tab extending from an inner edge the front plate, distal to the side plate, towards the first frame side.

4. The door window protector of claim 3, wherein the reinforcement tab is angled forward from the front plate.

5. The door window protector of claim 1, wherein:

the mounting frame further defines an upper frame end extending between the first frame side and the second frame side and a lower frame end opposite the upper frame end and extending between the first frame side and the second frame side;

the side frame member is a second side frame member; and the mounting frame comprises a first side frame member disposed at the first frame side, an upper frame member disposed at the upper frame end, and a lower frame member disposed at the lower frame end.

6. The door window protector of claim 5, wherein a mounting hole is formed through at least one of the first side frame member, the second side frame member, the upper frame member, and the lower frame member.

7. The door window protector of claim 6, wherein:

the mounting frame comprises an upper fastener plate secured to the upper frame member and a lower fastener plate secured to the lower frame member;

the mounting hole is an upper mounting hole formed through the upper fastener plate; and a lower mounting hole is formed through the lower fastener plate.

8. The door window protector of claim 5, wherein the upper frame member defines an upper guide channel and the lower frame member defines a lower guide channel, and wherein the protective panel engages and slides within each of the upper guide channel and the lower guide channel.

9. The door window protector of claim 8, wherein each of the upper frame member and the lower frame member are substantially U-shaped and comprise a front plate, a side plate, and a rear plate, the front plate defining a front side of corresponding upper or lower guide channel, the side plate defining a bottom of the corresponding upper guide channel or lower guide channel, and the rear plate defining a rear side of the corresponding upper guide channel or lower guide channel.

10. The door window protector of claim 8, wherein:

the protective panel comprises a panel body, an upper channel tab extending from an upper panel end of the panel body, and a lower channel tab extending from a lower panel end of the panel body;

the upper channel tab engages and slides within the upper guide channel; and the lower channel tab engages and slides within the lower guide channel.

11. The door window protector of claim 1, wherein:

the protective panel defines a first panel side, a second panel side, and a panel body extending from the first panel side to the second panel side;

the locking member extends from the panel body at the second panel side; and a panel handle extends forward from the panel body at the first panel side.

12. The door window protector of claim 11, wherein the panel handle comprises a substantially planar handle ledge extending forward from the first panel side and a handle grip extending forward from the handle ledge distal to the panel body.

13. The door window protector of claim 11, wherein:

the panel handle is formed monolithically with the panel body;

the panel and is bent forward relative to the panel body at the first panel side;

an upper panel slot extends into the panel body at the first panel side adjacent to an upper handle end of the panel handle;

a lower panel slot extends into the panel body at the first panel side adjacent to a lower handle end of the panel handle; and each of the upper panel slot and the lower panel slot facilitate bending the panel handle relative to the panel body.

14. The door window protector of claim 1, wherein the protective panel defines a first panel side and a second panel side, wherein a panel body of the protective panel extends from the first panel side to the second panel side, and wherein the locking member is a locking tab extending from the panel body at the second panel side.

15. The door window protector of claim 14, wherein:

the locking tab defines a tab leg extending from the panel body at the second panel side;

the locking tab further defines a tab head extending from the tab leg at a proximal end of the tab head, distal to the panel body;

a width of the tab leg can be less than a width of the tab head at the proximal end;

the tab head defines a locking shoulder at the proximal end; and the locking shoulder is configured to catch on an opening edge of the lock opening to retain the protective panel in the closed position.

16. The door window protector of claim 15, wherein the width of the tab head tapers substantially from the proximal end of the tab head towards a distal end of the tab head.

17. A door window protector comprising:

a mounting frame defining a first frame side, a second frame side opposite the first frame side, a frame opening extending between the first frame side and the second frame side, and a lock opening formed through the mounting frame at the second frame side; and a protective panel received within the frame opening and comprising a locking member, the protective panel movable relative to the mounting frame between an open position, wherein the protective panel is disposed proximate to the first frame side and the locking member is disengaged from the lock opening, and a closed position, wherein the protective panel is disposed proximate to the second frame side and the locking member engages the lock opening;

wherein:

the protective panel defines a first panel side, a second panel side, and a panel body extending from the first panel side to the second panel side;

the locking member extends from the panel body at the second panel side;

a panel handle extends forward from the panel body at the first panel side; and the panel handle comprises a substantially planar handle ledge extending forward from the first panel side and a handle grip extending forward from the handle ledge distal to the panel body.

18. A door window protector comprising:

a mounting frame defining a first frame side, a second frame side opposite the first frame side, a frame opening extending between the first frame side and the second frame side, and a lock opening formed through the mounting frame at the second frame side; and a protective panel received within the frame opening and comprising a locking member, the protective panel movable relative to the mounting frame between an open position, wherein the protective panel is disposed proximate to the first frame side and the locking member is disengaged from the lock opening, and a closed position, wherein the protective panel is disposed proximate to the second frame side and the locking member engages the lock opening;

wherein:

the protective panel defines a first panel side, a second panel side, and a panel body extending from the first panel side to the second panel side;

the locking member extends from the panel body at the second panel side;

a panel handle extends forward from the panel body at the first panel side;

the panel handle is formed monolithically with the panel body;

the panel and is bent forward relative to the panel body at the first panel side;

an upper panel slot extends into the panel body at the first panel side adjacent to an upper handle end of the panel handle;

a lower panel slot extends into the panel body at the first panel side adjacent to a lower handle end of the panel handle; and each of the upper panel slot and the lower panel slot facilitate bending the panel handle relative to the panel body.

19. A door window protector comprising:

a mounting frame defining a first frame side, a second frame side opposite the first frame side, a frame opening extending between the first frame side and the second frame side, and a lock opening formed through the mounting frame at the second frame side; and a protective panel received within the frame opening and comprising a locking member, the protective panel movable relative to the mounting frame between an open position, wherein the protective panel is disposed proximate to the first frame side and the locking member is disengaged from the lock opening, and a closed position, wherein the protective panel is disposed proximate to the second frame side and the locking member engages the lock opening;

wherein:

the protective panel defines a first panel side and a second panel side;

a panel body of the protective panel extends from the first panel side to the second panel side;

the locking member is a locking tab extending from the panel body at the second panel side;

the locking tab defines a tab leg extending from the panel body at the second panel side;

the locking tab further defines a tab head extending from the tab leg at a proximal end of the tab head, distal to the panel body;

a width of the tab leg can be less than a width of the tab head at the proximal end;

the tab head defines a locking shoulder at the proximal end; and the locking shoulder is configured to catch on an opening edge of the lock opening to retain the protective panel in the closed position.

20. The door window protector of claim 19, wherein the width of the tab head tapers substantially from the proximal end of the tab head towards a distal end of the tab head.

* * * * *